Nov. 26, 1957    M. W. VAN SCOYK    2,814,073
TIRE CASING SPOTTERS
Filed Aug. 30, 1954    3 Sheets-Sheet 1
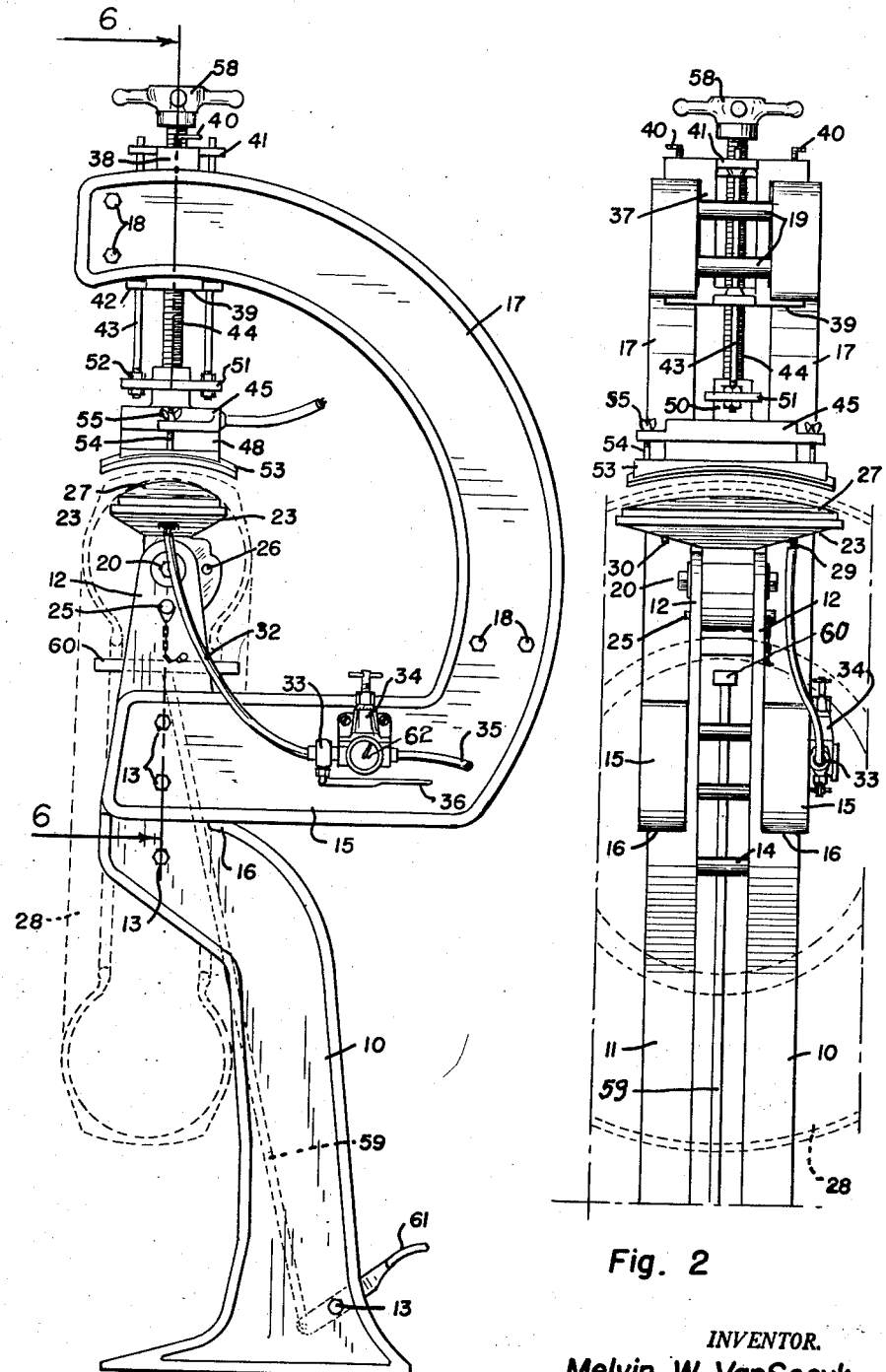
Fig. 1
Fig. 2
INVENTOR.
Melvin W. VanScoyk
BY
ATTORNEY

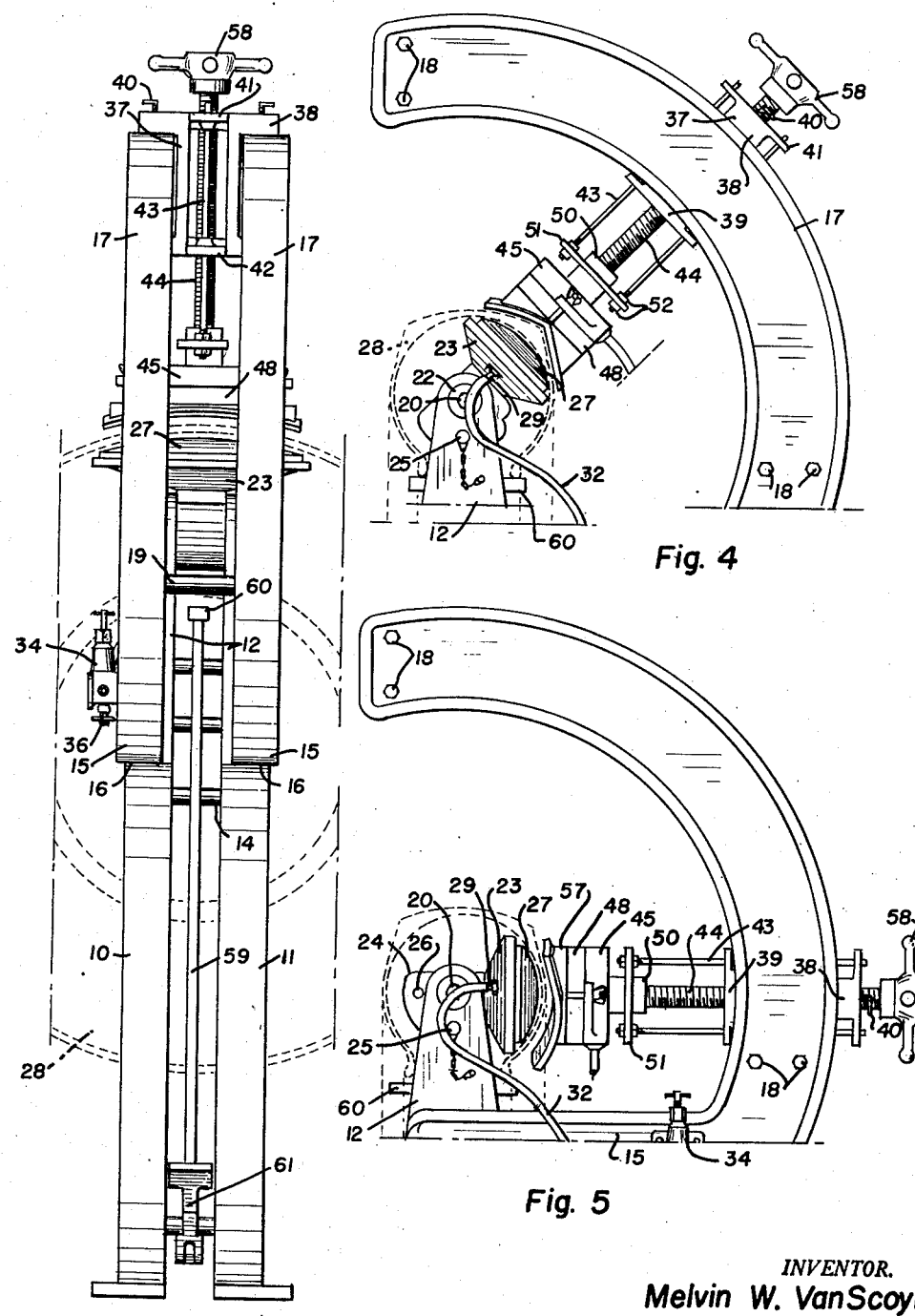

Nov. 26, 1957  M. W. VAN SCOYK  2,814,073
TIRE CASING SPOTTERS
Filed Aug. 30, 1954  3 Sheets-Sheet 3
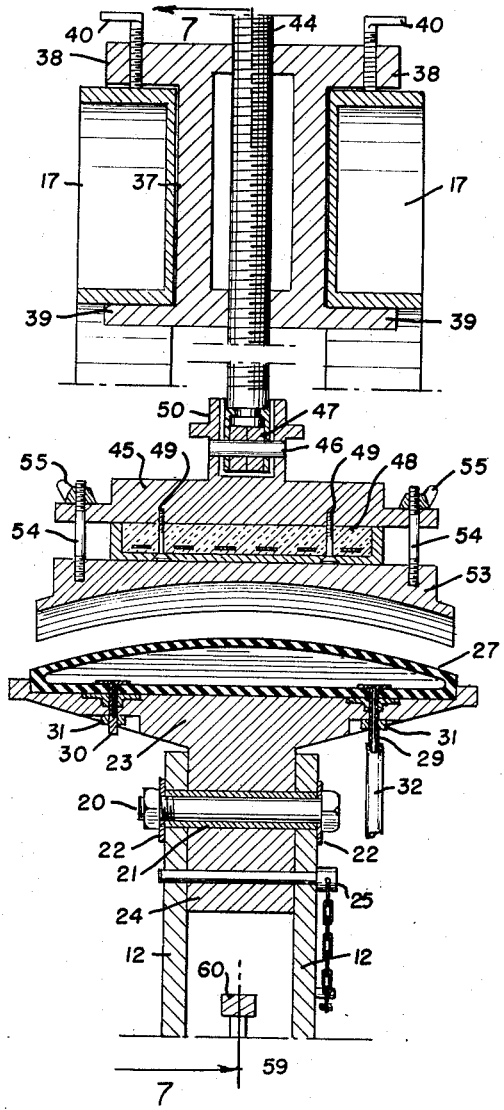
Fig. 6
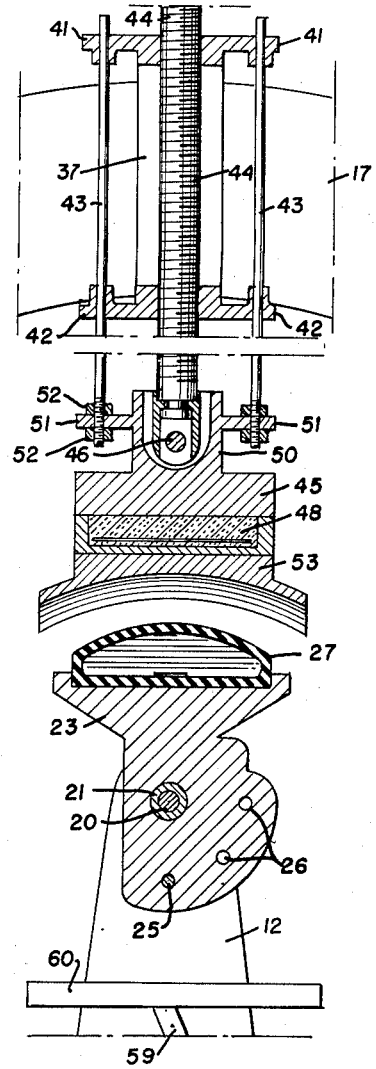
Fig. 7
INVENTOR.
Melvin W. VanScoyk
BY
ATTORNEY

United States Patent Office 2,814,073
Patented Nov. 26, 1957

2,814,073

TIRE CASING SPOTTERS

Melvin W. Van Scoyk, Arvada, Colo., assignor to Winner Manufacturing & Sales Co., Arvada, Colo., a corporation of Colorado Application August 30, 1954, Serial No. 453,115

2 Claims. (Cl. 18—18)

This invention relates to a tire casing repair device, and has for its principal object the provision of a tire casing repair device of the type known as a "spotter," that is, a device for making repairs at various "spots" upon a tire casing, and to provide a device of this character which can be quickly and easily adjusted to efficiently repair any desired spot on a tire casing while the latter is in a convenient hanging position so that manual manipulation of a heavy casing will be reduced to a minimum.

Another object is to provide a highly efficient pneumatic means for applying a pre-set uniform curing pressure to the area being repaired.

A further object is to provide foot-operated means for lifting the casing while on the device to still further reduce the manual labor usually involved in tire casing repair operations.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved tire casing repair device illustrating, in broken line, a tire casing in place thereon;

Fig. 2 is a front view of the upper portion of the device of Fig. 1;

Fig. 3 is a rear view thereof;

Figs. 4 and 5 are side views of the upper portion of the improved tire casing spotter, illustrating it in various positions of adjustment;

Fig. 6 is an enlarged, vertical section, taken on the line 6—6, Fig. 1; and

Fig. 7 is a similar vertical section, taken on the line 7—7, Fig. 6.

The improved spotter is supported upon two spaced-apart pedestal members 10 and 11 terminating at their upper extremities in two parallel spaced-apart hinge ears 12, through which a hinge bolt 20 horizontally extends. The two pedestal members 10 and 11 and the two hinge ears 12 are maintained in rigid, parallel, spaced relation by means of suitable attachment bolts 13 provided with spacing sleeves 14.

A horizontal base member 15 is bolted, by means of the bolts 13 or otherwise secured, to the outer face of each of the two pedestal members 10 and 11. The latter members are formed with suitable supporting shoulders 16 for receiving, aligning and supporting the base members 15. Each base member is formed with an upwardly and forwardly extending arcuate arm 17. The arms 17 are preferably cast integrally with the base members 15 to form a somewhat C-shaped structure and are maintained in rigid, parallel, spaced relation by means of suitable clamping bolts 18 provided with spacing sleeves 19. The arcs of the arcuate arms 17 are concentric about the axis of the hinge bolt 20.

The hinge bolt 20 extends through a bushing sleeve 21 which is clamped between clamping washers 22, when the bolt is tightened, to prevent the bolt from drawing the two ears 12 together, and to prevent the bushing sleeve 21 from rotating. The bushing sleeve 21 rotatably supports an air bag plate 23. The latter is provided with a lower mounting portion 24 which is fitted between the two hinge ears 12 and through which the bushing 21 passes. The mounting portion 24 of the bag plate 23 can be preset in any desired one of a plurality of angular positions by means of a locking pin 25 which is insertable through aligned holes in the ears 12 and through any desired one of a plurality of receiving holes 26 formed in a concentric series in the portion 24 about the axis of the bushing 21.

An inflatable air bag 27 is mounted in a receiving socket in the top of the air bag plate 23. The air bag is preformed with a flat bottom which rests in the receiving socket and with a longitudinally and transversely arched top which is shaped to substantially conform to the curvature of the inside of a conventional tire casing such as indicated in broken line at 28.

Two conventional pneumatic tire valve stems 29 and 30 are seated in and extend through the flat bottom of the bag and protrude downwardly therefrom through receiving openings in the air bag plate 23 where they are secured by means of suitable locking nuts 31 threaded upon the stems. The valve stem 30 is permanently closed. The valve stem 29, however, is open for the passage of air under pressure to the air bag 27. A flexible air tubing 32 leads from the open valve stem 29 to a two-way control valve 33.

The control valve is provided with a suitable valve handle 36 which, when swung in one direction, admits air to the air bag 27 and which, when swung in the other direction, discharges air form the air bag 27. The control valve 33 is mounted on and communicates with a pressure regulating valve 34 to which a compressed air supply line 35 leads. The pressure regulating valve 34 is provided with an indicating dial 62 which indicates the air pressure in the air bag 27. The valves 33 and 34 are conveniently mounted on the side of one of the base members 15 in any desired manner.

A crosshead member 37 is movably mounted between the two arcuate arms 17. The crosshead member 37 is provided with outside guide flanges 38, which overlap the outside edges of the arcuate arms 17, and with inside guide flanges 39, which overlap the inside edges thereof to guide the crosshead member in an arcuate path defined by the arcuate arms 17. The crosshead member 37 can be locked at any desired position along the arms 17 by means of set screws 40 which are threaded through the outside guide flanges 38 and which can be screwed into locking engagement with the arms 17.

The crosshead member 37 is also provided with a pair of upper guide arms 41 and with a pair of lower guide arms 42. A pair of spaced-apart, parallel guide rods 43 slidably project through the guide arms 41 and 42 and a jackscrew 44 is threaded through the crosshead member between and parallel to the guide rods 43. The guide rods 43 and the jackscrew 44 are constantly maintained in a radial position relative to the axis of the hinge bolt 20 by the outside and inside guide flanges 38 and 39.

An element plate 45 is mounted on a mounting pin 46 extending through a swivel member 47 which is clamped about the lower extremity of the jackscrew 44. An electric heating element 48, of any suitable conventional type is secured to the bottom of the element plate 45 by means of suitable cap screws 49 or in any other desired manner. The element plate 45 is provided with an upper jackscrew socket 50 into which the lower extremity of the jackscrew 44 extends. The socket 50 is formed with two oppositely projecting rod ears 51 into each of which one of the guide rods 43 is secured by means of suitable lock nuts 52 threaded thereon. The guide rods 43 act to prevent rotation of the jackscrew socket 50 and the element plate 45 when the jackscrew 44 is rotated by means of a hand wheel 58 mounted on its upper extremity.

A tread plate 53, having a contour to fit the tread of a conventional tire casing, may be clamped against the bottom of the heating element 48 by means of suitable threaded studs 54 which extend upwardly through stud openings in the element plate 45 and are securely clamped therein by means of suitable wing nuts 55.

A casing lifting rod 59 extends upwardly between the pedestal members 10 and 11 and terminates in a T-shaped head 60 which is positioned below the hinge bolt 20 and extends oppositely outward beneath the beads of the casing. The upper extremity of the rod 59 rests against the spacing sleeve 14 on the uppermost attachment bolt 13 and the lower extremity of the rod 59 is hingedly connected to the forward —extremity of a pedal lever 61 which is tiltably mounted on the lowermost attachment bolt 13.

The tread plate 53 can be replaced by plates or matrixes of various contours depending upon which portion of the tire casing is to be repaired. For instance, a corner tread plate 56, as shown in Fig. 4, or a side wall plate 57, as shown in Fig. 5, may be used.

Let us assume that it is desired to cure a repair in the tread of the casing 28. The air bag plate 23 is turned to the vertical position of Fig. 1 and locked by means of the pin 25. The casing 28 is hung over the air bag 27. It will be noted that the pedestal members 10 and 11 extend rearwardly below the base members 15 to allow clearance for the lower portion of the casing 28 so that it may hang freely suspended in a vertical position. The jackscrew 44 is now actuated by means of the hand wheel 58 to cause the tread plate 53 to descend against the repair in the tread to force the casing snugly against the air bag 27. The air valve 33 is now actuated to inflate the air bag so as to place a uniform pressure against the inside of the casing over the entire area of the repair. The electric circuit to the heating element 48 is closed to bring the temperature of the repair to a curing point. When the cure is completed, the air valve 33 is actuated to discharge the air from the air bag 27 so as to relieve the pressure from the threads of the jackscrew 44 so that the latter may be easily rotated to lift the tread plate from the casing. The pedal lever 61 is now actuated by the foot of the operator to force the T-head 60 upwardly against the bead portion of the casing so as to lift it from the air bag 27. The pedal and its push rod 59 and head 60 also serve to assist the operator in adjusting the casing to the proper position for repairing.

Let us assume it is desired to make a side tread repair. The tread plate 53 is removed by removing the wing nuts 55 and it is replaced by the corner tread plate 56. The pin 25 is removed and the air bag plate is turned to a 45° position. The pin is now reinserted to maintain the air bag plate 23 in the position of Fig. 4. The crosshead set screws 40 are released and the crosshead is slid around the arcuate arms 17 to position the corner tread plate 56 at a 45° position opposite the air bag 27. The hand wheel 58 is now rotated to clamp the plate 56 against the casing and the casing against the air bag, as shown in Fig. 4. The control valve 33 is actuated to admit air to the air bag 27 to snugly force the repaired area against the plate 56. After curing, the air is released from the bag to relieve the pressure from the jackscrew, the latter is unscrewed, and the casing is removed.

For a side wall repair, the bag plate 23 is turned to a horizontal position, as shown in Fig. 5, and locked in the position by means of the locking pin 25. The crosshead is then swung to the horizontal position of Fig. 5 and the process is repeated with the use of the side wall plate 57 as shown in Fig. 5.

The threads on the jackscrew 44 are rather coarse. A six-pitch thread has been found to be satisfactory. The coarseness of the thread serves a double purpose. First it causes the tread curing plates to move rapidly when the hand wheel 58 is rotated. The coarse thread also serves to lock itself when the pressure is applied in the air bag 27 so that the screw cannot be rotated until the air bag pressure has been released to prevent accidental rupture and damage to the air bags.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A tire casing repair device comprising a pedestal device, two parallel spaced-apart hinge ears formed on the upper extremity of said pedestal device, a horizontal hinge bolt supported between said hinge ears, a base member secured to said pedestal device below said hinge ears and extending horizontally rearward therefrom, a pair of spaced-apart circularly arcuate arms secured to the rear extremity of said base member and extending upwardly and forwardly therefrom on an arc concentric with the axis of said hinge bolt to a position above the latter; a bag plate tiltably mounted on said hinge bolt, an inflatable air bag mounted on said bag plate and adapted to support a tire casing transversely of the plane of curvature of said arms, a crosshead member slidably mounted between said arcuate arms, means for locking said crosshead member at any desired position along said arcuate arms, a jackscrew threaded through said crosshead member and extending radially of the axis of said hinge bolt, a heating element supported on the inner-axial extremity of said jackscrew, screw rotating means on the outer extremity of said jackscrew, a tire casing mandrel carried by said element and adapted to contact said casing in consequence of the rotation of said jackscrew, means extending between said cross head and said element acting to prevent rotation of the latter when said jackscrew is rotated, means for locking said bag plate at an angle to the vertical corresponding to the radial position of said crosshead on said arcuate arms, said pedestal device comprising two similar, spaced-apart pedestal members, each terminating at its upper extremity in one of said hinge ears, said pedestal members being offset rearwardly from said hinge bolt so that said casing can hang freely from said air bag out of contact with said pedestal device, a tiltable pedal mounted between said pedestal members adjacent their lower extremities, a push rod extending upwardly from said pedal between said pedestal members, and a T-shaped head formed on the upper extremity of said push rod below said hinge bolt and adapted when elevated to contact and elevate said casing from said air bag.

2. A tire casing repair device as described in claim 1 in which the air bag comprises: an elongated, inflatable enclosure having a flat bottom resting in a flat recess in the top of said bag plate, and a convex top having a longitudinal and lateral curvature approximating the contour of the inside wall of said casing and having two threaded studs extending downwardly through said flat bottom and through said bag plate; locking nuts threaded on said studs and acting to secure said bag on said plate, one of said studs being hollow; and means for conducting air under pressure through said hollow stud into said bag.

(References on following page)

References Cited in the file of this patent

UNITED STATES PATENTS

| | | |
|---|---|---|
| 1,455,240 | Cobb | May 15, 1923 |
| 1,846,012 | Becker | Feb. 23, 1932 |
| 1,983,705 | Pilblad et al. | Dec. 11, 1934 |
| 2,063,069 | Wheelock | Dec. 8, 1936 |
| 2,347,952 | James | May 2, 1944 |
| 2,421,100 | Lakso | May 27, 1947 |
| 2,501,577 | Pfeiffer | Mar. 21, 1950 |
| 2,669,984 | Gaschi | Feb. 16, 1954 |